US008896230B1

(12) United States Patent  
Zhang (10) Patent No.: US 8,896,230 B1  
(45) Date of Patent: Nov. 25, 2014

(54) BACKLIGHT DRIVE CIRCUIT WITH DUAL BOOST CIRCUITS

(71) Applicant: Shenzhen China Star Optoelectronics Technology Co., Ltd., Shenzhen, Guangdong Province (CN)

(72) Inventor: Hua Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 113 days.

(21) Appl. No.: 13/824,389

(22) PCT Filed: Mar. 5, 2013

(86) PCT No.: PCT/CN2013/072196  
§ 371 (c)(1),  
(2), (4) Date: Mar. 18, 2013

(87) PCT Pub. No.: WO2014/131202  
PCT Pub. Date: Sep. 4, 2014

(30) Foreign Application Priority Data

Feb. 28, 2013 (CN) .......................... 2013 1 0066369

(51) Int. Cl.  
*H05B 37/02* (2006.01)  
*G09G 3/34* (2006.01)  
*H05B 33/08* (2006.01)  
*G09G 3/36* (2006.01)

(52) U.S. Cl.  
CPC .......... *G09G 3/3406* (2013.01); *H05B 33/0821* (2013.01); *H05B 33/0815* (2013.01); *G09G 3/36* (2013.01); *G09G 2330/04* (2013.01); *G09G 2330/025* (2013.01)  
USPC ........... 315/291; 315/247; 315/307; 315/224; 315/312; 345/102; 345/204; 345/211; 363/23; 363/25

(58) Field of Classification Search  
CPC .... H05B 33/0815; H05B 33/08; H05B 37/02; H05B 37/036; H02M 3/156; H02M 2001/007; Y02B 20/346; G09G 2330/028; G09G 3/3406  
USPC ............. 315/185 R, 291, 219, 247, 224, 307, 315/312, 360; 345/77, 82, 87, 92, 102, 204, 345/211; 363/21.12, 23, 25; 323/282  
See application file for complete search history.

(56) References Cited

U.S. PATENT DOCUMENTS 8,525,428 B2 * 9/2013 Chen et al. .................... 315/219  
8,624,828 B2 * 1/2014 Uchimoto et al. ............ 345/102  
(Continued)

FOREIGN PATENT DOCUMENTS

| CN | 1805258 A | 7/2006 |
| CN | 101431845 A | 5/2009 |
| CN | 102122885 A | 7/2011 |

(Continued)

*Primary Examiner* — Haiss Philogene  
(74) *Attorney, Agent, or Firm* — Cheng-Ju Chiang (57) ABSTRACT

The present invention provides an LED backlight drive circuit, which includes a first power supply module, an electrical inductor, a rectifier diode, a MOS transistor, an electrolytic capacitor, an LED light string, a voltage division module, a voltage comparator, a second power supply module, and an LED constant-current drive chip. The LED backlight drive circuit is arranged to include a voltage comparator in an external circuit of the LED constant-current drive chip to detect output voltage of the drive circuit so that high voltage, the voltage comparator is caused to supply a low voltage level to forcibly pull down a PWM dimming signal or an ENA enabling signal of the LED constant-current drive chip to achieve an over-voltage protection function and also enable removal of over-voltage protection module from a conventional LED constant-current drive chip.

10 Claims, 4 Drawing Sheets

(56) References Cited

U.S. PATENT DOCUMENTS

| | | | |
|---|---|---|---|
| 8,779,665 B2 * | 7/2014 | Oh et al. | 315/151 |
| 8,823,285 B2 * | 9/2014 | Chobot | 315/307 |
| 2013/0313996 A1 * | 11/2013 | Williams | 315/291 |
| 2013/0322059 A1 * | 12/2013 | Gao et al. | 362/97.1 |
| 2014/0139498 A1 * | 5/2014 | Hussain et al. | 345/204 |

FOREIGN PATENT DOCUMENTS

| | | |
|---|---|---|
| CN | 102354483 A | 2/2012 |
| WO | 2012/113764 A2 | 8/2012 |

\* cited by examiner

BACKLIGHT DRIVE CIRCUIT WITH DUAL BOOST CIRCUITS

BACKGROUND OF THE INVENTION

1. Field of the Invention

The present invention relates to the field of backlight driving of liquid crystal displays, and in particular to a backlight drive circuit with dual boost circuits.

2. The Related Arts

Nowadays, science and technology are in rapid progress and various innovated information devices are available in the market to suit the needs of general people. In early days, displaying devices are mostly CRT (Cathode Ray Tube) displays, which have a bulky size and consumes a large amount of electrical power and generate radiation so that long term use of the displays is hazardous to body health for users. Thus, the displays that are currently available in the market are gradually switched from liquid crystal displays (LCDs) that substitute the CRT displays used in early days.

LCDs have a variety of advantages, such as thin device body, low power consumption, and being free of radiation, and are thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a drive voltage is applied to the two glass substrates to control the liquid crystal molecules to change direction in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the location where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and is projected out through a light emergence face of the light guide plate, after being reflected and diffused, to thereby pass through an optic film assembly to form a planar light source for the liquid crystal display panel.

Figure 1:
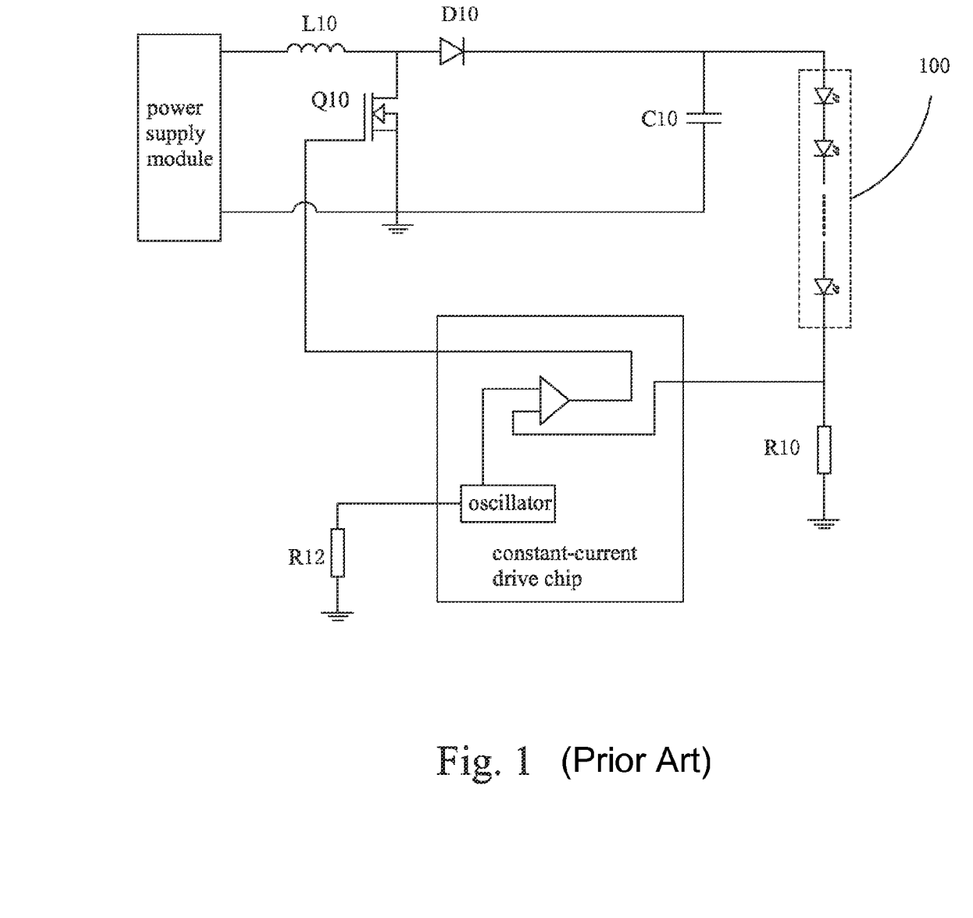
FIG. 1 is a circuit diagram of a conventional backlight drive circuit with single boost circuit.

With the progress of science and technology and the increasing demand for material of the modern people, the LCDs are now made with increasingly expanded sizes and the size of the liquid crystal display panels is also getting larger and larger, whereby the needed LED backlighting brightness is also getting greater and greater. Referring to FIG. 1, which is a circuit diagram of a conventional LED backlight drive circuit with a single boost circuit, which comprises an electrical inductor L10, a MOS transistor Q10, a rectifier diode D10, and an output electrolyte capacitor C10 to form a single boost circuit that provides a higher level of voltage to an LED light string 100, wherein the magnitude of the output voltage is related to the duty ratio (D) of a gate drive signal of the MOS transistor Q10. The output voltage Vo=Vin(1−D) and the greater the duty ratio D is, the greater the output voltage Vo will be. However, increasing the duty ratio D will extend the conduction time of the MOS transistor 10 in a cycle, whereby the electrical current in the electrical inductor L10 linearly increases so that the current quickly raises. This current also flows through the MOS transistor Q10. The power consumed in the electrical inductor L10 and the MOS transistor Q10 is increased and temperature rises. When the electrical current through the electrical inductor L10 exceed the maximum level of current that the electrical inductor L10 and the MOS transistor Q10 can take, the electrical inductor L10 or the MOS transistor Q10 will get burnt down. Due to the limitation imposed on the specifications of the components of the circuit, a single boost circuit can provide a power that is limited (around 70 W) and does not suit the needs for development of liquid crystal displays.

SUMMARY OF THE INVENTION

Thus, an object of the present invention is to provide a backlight drive circuit with dual boost circuits, whereby with two boost circuits to operate alternately, an increased output power can be provided and also reduces the magnitude of ripple of output current and the influence of EMI when two boost circuits operate simultaneously so that reliability and pass rate of product can be enhanced.

To achieve the object, the present invention provides a backlight drive circuit with dual boost circuits, which comprises: a power supply module, a first electrical inductor, a second electrical inductor, a first rectifier diode, a second rectifier diode, an LED light string, a constant current driving chip, an electrical capacitor, a first MOS transistor, a second MOS transistor, a first voltage comparator, and a constant voltage power source. The first electrical inductor has an end electrically connected to the power supply module and an opposite end electrically connected to the first rectifier diode. The second electrical inductor has an end electrically connected to the power supply module and an opposite end electrically connected to an end of the second rectifier diode. The first rectifier diode is electrically connected to an end of the electrical capacitor and an end of the LED light string. The second rectifier diode is electrically connected to an end of the first rectifier diode, the end of the LED light string, and the end of the electrical capacitor. The LED light string is further electrically connected to the constant current driving chip. The electrical capacitor is further electrically connected to the first MOS transistor, the second MOS transistor, and the power supply module. The first MOS transistor is further electrically connected to the first voltage comparator, the constant current driving chip, the opposite end of the first electrical inductor, and the end of the first rectifier diode. The second MOS transistor is further electrically connected to the first voltage comparator, the opposite end of the second electrical inductor, and the end of the second rectifier diode. The first voltage comparator is further electrically connected to the constant voltage power source. The first and second MOS transistors are both electrically connected to the power supply module.

The electrical capacitor is an electrolyte capacitor.

The backlight drive circuit with dual boost circuits further comprises: a first and a second resistors. The first resistor has an end electrically connected to the LED light string and the constant current driving chip and an opposite end electrically connected to a grounding line. The second resistor has an end electrically connected to the constant current driving chip and an opposite end electrically connected to the grounding line.

The first MOS transistor comprises a first gate terminal, a first drain terminal, and a first source terminal. The first gate terminal is electrically connected to the first voltage comparator and the constant current driving chip. The first drain terminal is electrically connected to the opposite end of the first electrical inductor and the end of the first rectifier diode. The first source terminal is electrically connected to the power supply module.

The second MOS transistor comprises a second gate terminal, a second drain terminal, and a second source terminal. The second gate terminal is electrically connected to the first voltage comparator. The second drain terminal is electrically connected to the opposite end of the second electrical inductor and the end of the second rectifier diode. The second source terminal is electrically connected to the power supply module.

The first voltage comparator comprises a first output pin, a first positive input pin, and a first negative input pin. The first output pin is electrically connected to the second gate terminal of the second MOS transistor. The first positive input pin is electrically connected to the constant voltage power source. The first negative input pin is electrically connected to the gate terminal of the first MOS transistor and the constant current driving chip.

The constant current driving chip comprises first to third pins. The first pin is electrically connected to the first negative input pin of the first voltage comparator and the first gate terminal of the first MOS transistor. The second pin is electrically connected to the LED light string and the end of the first resistor. The third pin is electrically connected to the second resistor.

The constant current driving chip comprises: an oscillator and a second voltage comparator. The second voltage comparator comprises a second output pin, a second positive input pin, and a second negative input pin. The second output pin is electrically connected to the first pin of the constant current driving chip. The second negative input pin is electrically connected to the second pin of the constant current driving chip. The second positive input pin is electrically connected to the oscillator. The oscillator is further electrically connected to the third pin of the constant current driving chip.

The constant voltage power source outputs a voltage that is smaller than or equal to a threshold voltage of the first MOS transistor. The first voltage comparator outputs a voltage that is greater than or equal to a threshold voltage of the second MOS transistor.

The present invention also provides a backlight drive circuit with dual boost circuits, which comprises: a power supply module, a first electrical inductor, a second electrical inductor, a first rectifier diode, a second rectifier diode, an LED light string, a constant current driving chip, an electrical capacitor, a first MOS transistor, a second MOS transistor, a first voltage comparator, and a constant voltage power source, the first electrical inductor having an end electrically connected to the power supply module and an opposite end electrically connected to the first rectifier diode, the second electrical inductor having an end electrically connected to the power supply module and an opposite end electrically connected to an end of the second rectifier diode, the first rectifier diode being electrically connected to an end of the electrical capacitor and an end of the LED light string, the second rectifier diode being electrically connected to an end of the first rectifier diode, the end of the LED light string, and the end of the electrical capacitor, the LED light string being further electrically connected to the constant current driving chip, the electrical capacitor being further electrically connected to the first MOS transistor, the second MOS transistor, and the power supply module, the first MOS transistor being further electrically connected to the first voltage comparator, the constant current driving chip, the opposite end of the first electrical inductor, and the end of the first rectifier diode, the second MOS transistor being further electrically connected to the first voltage comparator, the opposite end of the second electrical inductor, and the end of the second rectifier diode, the first voltage comparator being further electrically connected to the constant voltage power source, the first and second MOS transistors being both electrically connected to the power supply module;

wherein the electrical capacitor is an electrolyte capacitor;

further comprising: a first and a second resistors, the first resistor having an end electrically connected to the LED light string and the constant current driving chip and an opposite end electrically connected to a grounding line, the second resistor having an end electrically connected to the constant current driving chip and an opposite end electrically connected to the grounding line;

wherein the first MOS transistor comprises a first gate terminal, a first drain terminal, and a first source terminal, the first gate terminal being electrically connected to the first voltage comparator and the constant current driving chip, the first drain terminal being electrically connected to the opposite end of the first electrical inductor and the end of the first rectifier diode, the first source terminal being electrically connected to the power supply module;

wherein the second MOS transistor comprises a second gate terminal, a second drain terminal, and a second source terminal, the second gate terminal being electrically connected to the first voltage comparator, the second drain terminal being electrically connected to the opposite end of the second electrical inductor and the end of the second rectifier diode, the second source terminal being electrically connected to the power supply module;

wherein the first voltage comparator comprises a first output pin, a first positive input pin, and a first negative input pin, the first output pin being electrically connected to the second gate terminal of the second MOS transistor, the first positive input pin being electrically connected to the constant voltage power source, the first negative input pin being electrically connected to the gate terminal of the first MOS transistor and the constant current driving chip;

wherein the constant current driving chip comprises first to third pins, the first pin being electrically connected to the first negative input pin of the first voltage comparator and the first gate terminal of the first MOS transistor, the second pin being electrically connected to the LED light string and the end of the first resistor, the third pin being electrically connected to the second resistor;

wherein the constant current driving chip comprises: an oscillator and a second voltage comparator, the second voltage comparator comprising a second output pin, a second positive input pin, and a second negative input pin, the second output pin being electrically connected to the first pin of the constant current driving chip, the second negative input pin being electrically connected to the second pin of the constant current driving chip, the second positive input pin being electrically connected to the oscillator, the oscillator being further electrically connected to the third pin of the constant current driving chip; and wherein the constant voltage power source outputs a voltage that is smaller than or equal to a threshold voltage of the first MOS transistor, the first voltage comparator outputting a voltage that is greater than or equal to a threshold voltage of the second MOS transistor.

The efficacy of the present invention is that the present invention provides a backlight drive circuit with dual boost circuits, which includes a voltage comparator to generate two drive signals having opposite phases to respectively drive two MOS transistors contained in the two boost circuits so as to make the two boost circuits operating alternately and thus provide a substantially direct current after combination at a rear side of the circuit with a resultant amplitude equal to the peak value of triangular waves of a single boost circuit thereby increasing output power of the circuit but without doubling of the amplitude. In this way, there is no need to upgrade the specification of rectifier diode and the manufacture cost is reduced. Further, the electrical currents from the two electrical inductors are alternating and superimposed to each other so that the magnitude of ripple of the output current is reduced and doubling electromagnetic interference caused by simulators operation of two boost circuits is eliminated thereby helping improve passing rate of product.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
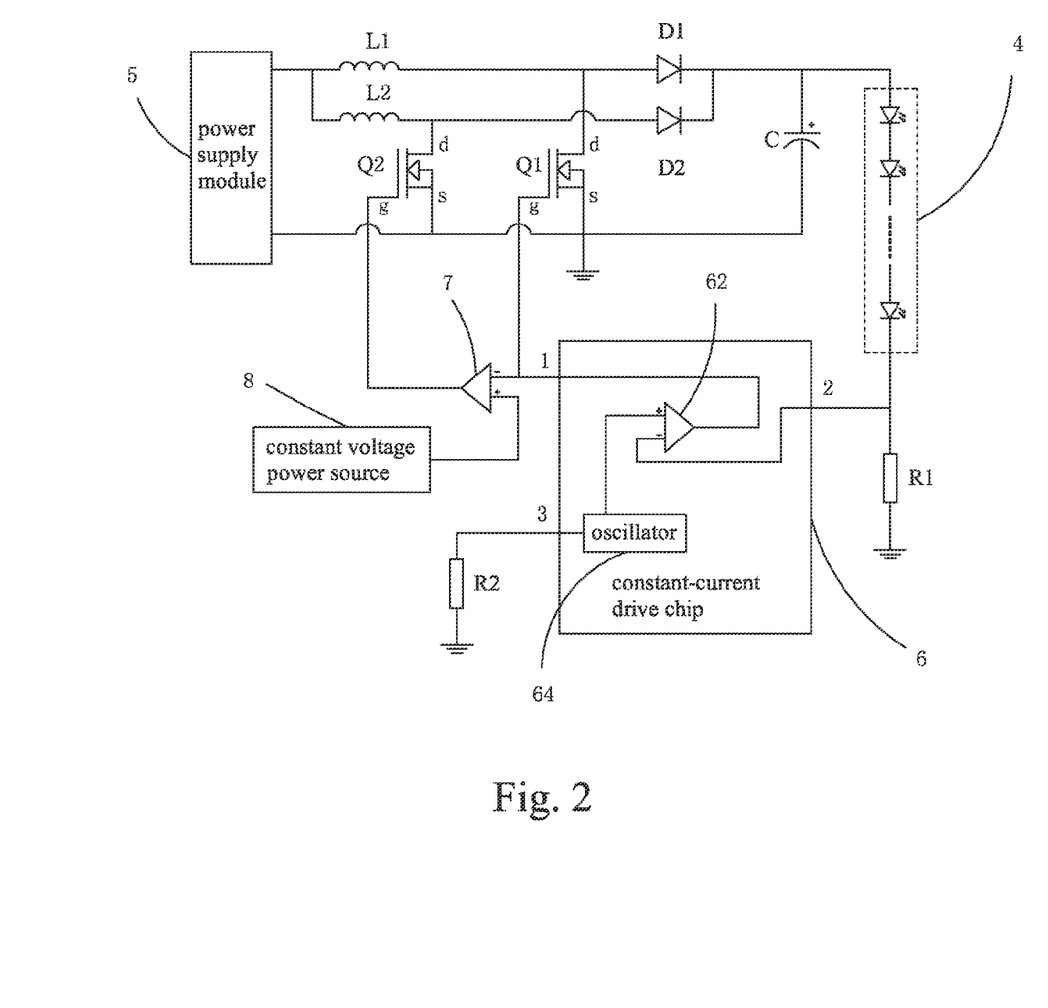
FIG. 2 is a circuit diagram of a backlight drive circuit according to the present invention with two boost circuits operating alternately.
Figure 3:
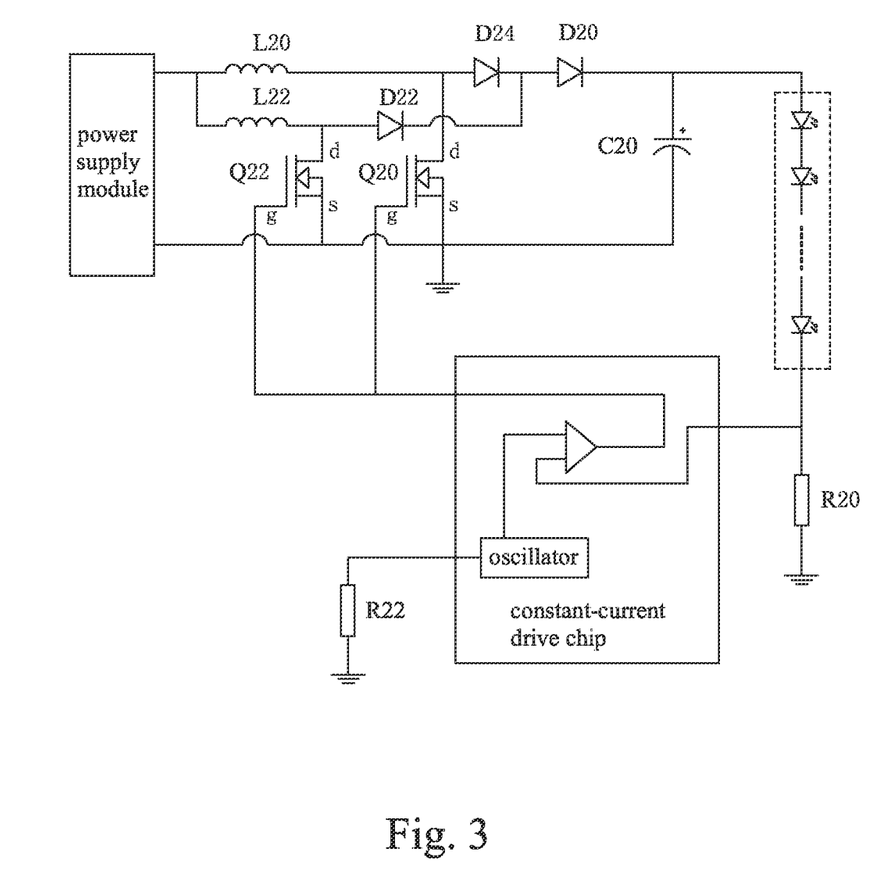
FIG. 3 is a circuit diagram of a backlight drive circuit according to the present invention with two boost circuits operating simultaneously.
Figure 4:
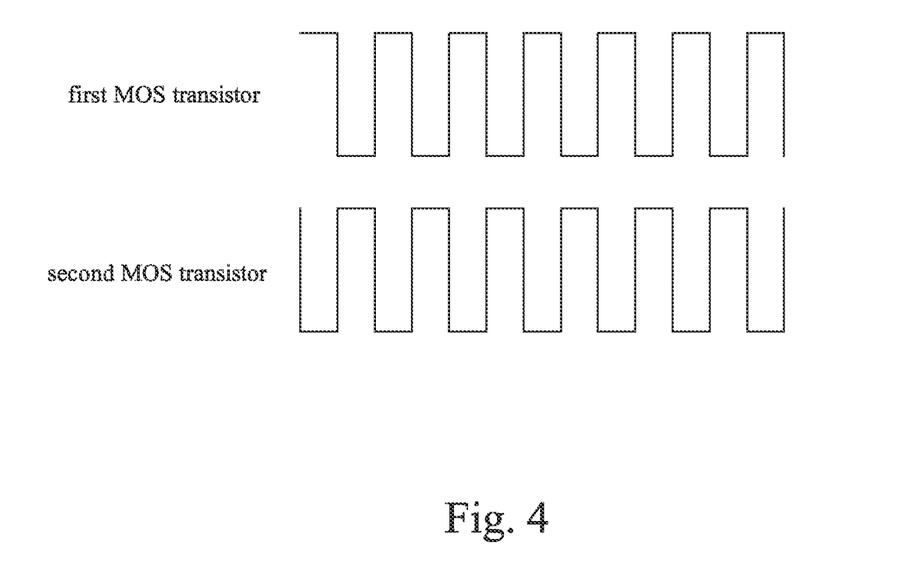
FIG. 4 is a diagram showing waveforms of drive signals of first and second MOS transistors according to the present invention.

Referring to FIGS. 2-5, the present invention provides a backlight drive circuit with dual boost circuits, which comprises: a power supply module 5, a first electrical inductor L1, a second electrical inductor L2, a first MOS transistor Q1, a second MOS transistor Q2, a first rectifier diode D1, a second rectifier diode D2, an electrical capacitor C, a first voltage comparator 7, a constant voltage power source 8, a constant current driving chip 6, a first resistor R1, a second resistor R2, and an LED light string 4. The first electrical inductor L1, the first rectifier diode D1, and the first MOS transistor Q1 collectively form a boost circuit. The second electrical inductor L2, the second rectifier diode D2, and the second MOS transistor Q2 collectively form another boost circuit. The two boost circuits are connection in parallel to each other. The backlight drive circuit uses the first voltage comparator 7 to generate two drive signals having opposite phases to respectively drive the first and second MOS transistors Q1, Q2 of the two boost circuits, as shown in FIG. 4, whereby the two boost circuits are caused to operate alternately to have the amplitude of the output current equal to the peak value of the triangular waveform of a single boost circuit so as to increase the output power.

Specifically, the first electrical inductor L1 has an end electrically connected to the power supply module 5 and an opposite end electrically connected to an end of the first rectifier diode D1. The second electrical inductor L2 has an end electrically connected to the power supply module 5 and an opposite end electrically connected to an end of the second rectifier diode D2. The first rectifier diode D1 is electrically connected to the opposite end of the electrical capacitor C and an end of the LED light string 4. The second rectifier diode D2 is electrically connected to an end of the first rectifier diode D1, the end of the LED light string 4, and the end of the electrical capacitor C. The LED light string 4 is also electrically connected to an end of the first resistor R1 and the constant current driving chip 6. The first resistor R1 has an opposite electrically connected to the grounding line. The first MOS transistor Q1 comprises a first gate terminal g, a first drain terminal d, and a first source terminal s. The first drain terminal d of the first MOS transistor Q1 is the opposite end of the first electrical inductor L1 and the end of the first rectifier diode D1. The first source terminal s is electrically connected to the power supply module 5. The first gate terminal g is electrically connected to the constant current driving chip 6. The second MOS transistor Q2 comprises a second gate terminal g, a second drain terminal d, and a second source terminal s. The second drain terminal d of the second MOS transistor Q2 is electrically connected to the opposite end of the second electrical inductor L2 and the end of the second rectifier diode D2. The second source terminal s is electrically connected to the power supply module 5. The second gate terminal g is electrically connected to the first voltage comparator 7. The first voltage comparator 7 comprises a first output pin, a first positive input pin, and a first negative input pin. The first output pin of the first voltage comparator 7 is electrically connected to the second gate terminal g of the second MOS transistor Q2; the first positive input pin is electrically connected to the constant voltage power source 8; and the first negative input pin is electrically connected to the gate terminal g of the first MOS transistor Q1 and the constant current driving chip 6. The opposite end of the electrical capacitor C is electrically connected to the power supply module 5 and the grounding line.

The constant current driving chip 6 comprises first, second, and third pins 1, 2, 3. The first pin 1 is electrically connected to the first gate terminal g of the first MOS transistor Q1 and the first negative input pin of the first voltage comparator 7; the second pin 2 is electrically connected to the LED light string 4 and the end of the first resistor R1; and the third pin 3 is connected via the second resistor R2 to the grounding line so that changing the resistance of the second resistor R2 enables setting of the driving frequency that the constant current driving chip 6 drives the first and second MOS transistors Q1, Q2. The constant current driving chip 6 comprises a second voltage comparator 62 and an oscillator 64. The second voltage comparator 62 comprises a second output pin, a second positive input pin, and a second negative input pin. The second output pin is electrically connected to the first pin 1 of the constant current driving chip 6; the second negative input pin is electrically connected to the second pin 2 of the constant current driving chip 6; and the second positive input pin is electrically connected to an end of the oscillator 64. The oscillator 64 has an opposite end electrically connected to the third pin 3 of the constant current driving chip 6. The electrical capacitor C can be an electrolyte capacitor, which comprises a positive terminal and a negative terminal. The positive terminal is electrically connected to the opposite end of the first rectifier diode D1, the opposite end of the second rectifier diode D2, and an end of the LED light string 4. The negative terminal is electrically connected to the power supply module 5. The first rectifier diode D1 comprises an anode and a cathode. The anode is electrically connected to the first electrical inductor L1 and the first MOS transistor Q1. The cathode is electrically connected to the electrolyte capacitor C, the LED light string 4, and the second rectifier diode D2. The second rectifier diode D2 comprises an anode and a cathode. The anode is electrically connected to the second electrical inductor L2 and the second MOS transistor Q2. The cathode is electrically connected to the electrolyte capacitor C, the LED light string 4, and the first rectifier diode D1.

The first resistor R1 provides a function of current limiting protection in the circuit for preventing the circuit from being burnt down by excessively large current. The electrolyte capacitor C functions to maintain a continuous current at the output terminal of the drive circuit. The first rectifier diode D1 provides a function of rectification, which, when the first MOS transistor Q1 is conducted on, prevents the electrolyte capacitor C and the second electrical inductor L2 from discharging to the ground. The second rectifier diode D2 provides a function of rectification, which, when the second MOS transistor Q2 is conducted on, prevents the electrolyte capacitor C and the first electrical inductor L1 from discharging to the ground.

The constant voltage power source 8 has an output voltage that is slightly smaller than or equal to a threshold voltage of the first MOS transistor Q1 and is preferably slightly smaller than the threshold voltage of the first MOS transistor Q1. The first output pin of the first voltage comparator 7 has an output voltage that is slightly greater than or equal to a threshold voltage of the second MOS transistor Q2. When the first negative input pin of the first voltage comparator 7 is of a high voltage level (namely the voltage level of the first negative input pin being higher than that of the first positive input pin), the first output pin outputs a low voltage level to the second gate terminal g of the second MOS transistor Q2; and when the first negative input pin is of a low voltage level (namely the voltage level of the first negative input pin being lower than that of the first positive input pin), the first output pin outputs a high voltage level to the second gate terminal g of the second MOS transistor Q2. As a result, a drive signal of the second MOS transistor Q2 is of opposite phase to a drive signal of the first MOS transistor Q1, as shown in FIG. 4, so as to make the two boost circuits operate alternately. Namely, when the first MOS transistor Q1 is conducted on, the second MOS transistor Q2 is shut off and when the first MOS transistor Q1 is shut off, the second MOS transistor Q2 is conducted on.

Figure 5:
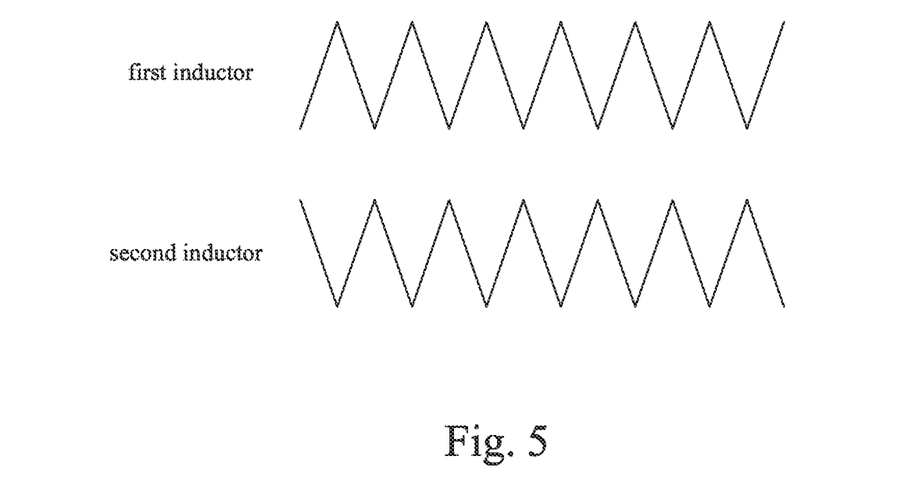
FIG. 5 is a diagram showing waveforms of electrical currents flowing through first and second electrical inductors according to the present invention.

The operation principle of the backlight drive circuit with dual boost circuits according to the present invention is as follows: When the first pin 1 of the constant current driving chip 6 outputs a high voltage level, the first gate terminal g of the first MOS transistor Q1 is set in high voltage level and the first MOS transistor Q1 is conducted on. Since the voltage level at the first negative input pin of the first voltage comparator 7 is higher than the voltage level of the first positive input pin, the first voltage comparator 7 outputs a low voltage level to the second gate terminal g of the second MOS transistor Q2 so that the second MOS transistor Q2 is shut off. Under this condition, the first electrical inductor L1 is charged and the second electrical inductor L2 is discharged. When the first pin 1 of the constant current driving chip 6 outputs a low voltage level, the first gate terminal g of the first MOS transistor Q1 is set in low voltage level and the first MOS transistor Q1 is shut off. Since the voltage level at the first negative input pin of the first voltage comparator 7 is lower than the voltage level of the first positive input pin, the first voltage comparator 7 outputs a high voltage level to the second gate terminal g of the second MOS transistor Q2 so that the second MOS transistor Q2 is conducted on. Under this condition, the first electrical inductor L1 is discharged and the second electrical inductor L2 is charged. Cyclically operating in this way allows the first and second MOS transistors Q1, Q2 to alternately operating so that the triangular waves of electrical current of the first and second electrical inductor L1, L2 are opposite to each other as shown in FIG. 5, whereby when they are combined at the rear side of the circuit, the currents are superimposed to form a substantially direct current having an amplitude substantially equal to the peak value of the triangular wave occurring in a backlight drive circuit with single boost circuit and thus the output power is increased.

It is clear from the law of energy conservation that the output power of the LED backlight drive circuit is converted from an input power and to obtain a greater output power equals to supply of a greater input power. Since the maximum electrical current that is allowed to flow through the inductors and the MOS transistors is limited, using two inductors and two MOS transistors in parallel connection in the LED backlight drive circuit provides an effect of flow division and subsequently combination at a rear side of the circuit. In this way, the circuit may take doubled input current (that is converted into doubled input power) and the output power supplied thereby can also be doubled. Referring to FIG. 3, the two MOS transistors Q20, Q22 share the same drive signal so that the two are conducted on or shut off at the same time. Under this condition, the triangular waves of the electrical currents through the two inductors L20, 22 are identical and, after being combined later in the rear side of the circuit, they are still a triangular wave but with a doubled amplitude, which will exceed the current bearing level of the entire rectifier diode D20, resulting in burning down of the rectifier diode D20. Consequently, a rectifier diode with a high current bearing level must be used to handle the problem and this certainly raises the cost. Further, since the amplitude of the triangular wave is doubled, ripples of the output current are also doubled and the accuracy of the output current deteriorates. The two MOS transistors being simultaneously conducted on or shut off also puts in a doubled influence on electromagnetic interference (EMI). This may eventually affects the passing rate of the product.

On the other hand, the present invention uses two drive signals having opposite phases to respectively drive the two MOS transistors Q1, Q2 so that the two MOS transistors Q1, Q2 operate alternately and discharging currents supplied from the two electrical inductors L1, L2 are respectively guided through the rectifier diodes D1, D2 for discharging to the electrolyte capacitor C, making it not possible to double the amplitude. As such, there is no need to upgrade the specification of the rectifier diode. The electrical currents of the first and second electrical inductors L1, L2 alternating and superimposed to each other makes it possible to reduce the magnitude of ripple of the output current and eliminate doubled EMI caused by simulators operation of two boost circuits so as to help improve passing rate of product.

In summary, the present invention provides a backlight drive circuit with dual boost circuits, which includes a voltage comparator to generate two drive signals having opposite phases to respectively drive two MOS transistors contained in the two boost circuits so as to make the two boost circuits operating alternately and thus provide a substantially direct current after combination at a rear side of the circuit with a resultant amplitude equal to the peak value of triangular waves of a single boost circuit thereby increasing output power of the circuit but without doubling of the amplitude. In this way, there is no need to upgrade the specification of rectifier diode and the manufacture cost is reduced. Further, the electrical currents from the two electrical inductors are alternating and superimposed to each other so that the magnitude of ripple of the output current is reduced and doubling electromagnetic interference caused by simulators operation of two boost circuits is eliminated thereby helping improve passing rate of product.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight drive circuit with dual boost circuits, comprising: a power supply module, a first electrical inductor, a second electrical inductor, a first rectifier diode, a second rectifier diode, an LED (Light Emitting Diode) light string, a constant current driving chip, an electrical capacitor, a first MOS (Metal Oxide Semiconductor) transistor, a second MOS transistor, a first voltage comparator, and a constant voltage power source, the first electrical inductor having an end electrically connected to the power supply module and an opposite end electrically connected to the first rectifier diode, the second electrical inductor having an end electrically connected to the power supply module and an opposite end electrically connected to an end of the second rectifier diode, the first rectifier diode being electrically connected to an end of the electrical capacitor and an end of the LED light string, the second rectifier diode being electrically connected to an end of the first rectifier diode, the end of the LED light string, and the end of the electrical capacitor, the LED light string being further electrically connected to the constant current driving chip, the electrical capacitor being further electrically connected to the first MOS transistor, the second MOS transistor, and the power supply module, the first MOS transistor being further electrically connected to the first voltage comparator, the constant current driving chip, the opposite end of the first electrical inductor, and the end of the first rectifier diode, the second MOS transistor being further electrically connected to the first voltage comparator, the opposite end of the second electrical inductor, and the end of the second rectifier diode, the first voltage comparator being further electrically connected to the constant voltage power source, the first and second MOS transistors being both electrically connected to the power supply module.

2. The backlight drive circuit with dual boost circuits as claimed in claim 1, wherein the electrical capacitor is an electrolyte capacitor.

3. The backlight drive circuit with dual boost circuits as claimed in claim 1 further comprising: a first and a second resistors, the first resistor having an end electrically connected to the LED light string and the constant current driving chip and an opposite end electrically connected to a grounding line, the second resistor having an end electrically connected to the constant current driving chip and an opposite end electrically connected to the grounding line.

4. The backlight drive circuit with dual boost circuits as claimed in claim 3, wherein the first MOS transistor comprises a first gate terminal, a first drain terminal, and a first source terminal, the first gate terminal being electrically connected to the first voltage comparator and the constant current driving chip, the first drain terminal being electrically connected to the opposite end of the first electrical inductor and the end of the first rectifier diode, the first source terminal being electrically connected to the power supply module.

5. The backlight drive circuit with dual boost circuits as claimed in claim 4, wherein the second MOS transistor comprises a second gate terminal, a second drain terminal, and a second source terminal, the second gate terminal being electrically connected to the first voltage comparator, the second drain terminal being electrically connected to the opposite end of the second electrical inductor and the end of the second rectifier diode, the second source terminal being electrically connected to the power supply module.

6. The backlight drive circuit with dual boost circuits as claimed in claim 5, wherein the first voltage comparator comprises a first output pin, a first positive input pin, and a first negative input pin, the first output pin being electrically connected to the second gate terminal of the second MOS transistor, the first positive input pin being electrically connected to the constant voltage power source, the first negative input pin being electrically connected to the gate terminal of the first MOS transistor and the constant current driving chip.

7. The backlight drive circuit with dual boost circuits as claimed in claim 6, wherein the constant current driving chip comprises first to third pins, the first pin being electrically connected to the first negative input pin of the first voltage comparator and the first gate terminal of the first MOS transistor, the second pin being electrically connected to the LED light string and the end of the first resistor, the third pin being electrically connected to the second resistor.

8. The backlight drive circuit with dual boost circuits as claimed in claim 7, wherein the constant current driving chip comprises: an oscillator and a second voltage comparator, the second voltage comparator comprising a second output pin, a second positive input pin, and a second negative input pin, the second output pin being electrically connected to the first pin of the constant current driving chip, the second negative input pin being electrically connected to the second pin of the constant current driving chip, the second positive input pin being electrically connected to the oscillator, the oscillator being further electrically connected to the third pin of the constant current driving chip.

9. The backlight drive circuit with dual boost circuits as claimed in claim 1, wherein the constant voltage power source outputs a voltage that is smaller than or equal to a threshold voltage of the first MOS transistor, the first voltage comparator outputting a voltage that is greater than or equal to a threshold voltage of the second MOS transistor.

10. A backlight drive circuit with dual boost circuits, comprising: a power supply module, a first electrical inductor, a second electrical inductor, a first rectifier diode, a second rectifier diode, an LED (Light Emitting Diode) light string, a constant current driving chip, an electrical capacitor, a first MOS (Metal Oxide Semiconductor) transistor, a second MOS transistor, a first voltage comparator, and a constant voltage power source, the first electrical inductor having an end electrically connected to the power supply module and an opposite end electrically connected to the first rectifier diode, the second electrical inductor having an end electrically connected to the power supply module and an opposite end electrically connected to an end of the second rectifier diode, the first rectifier diode being electrically connected to an end of the electrical capacitor and an end of the LED light string, the second rectifier diode being electrically connected to an end of the first rectifier diode, the end of the LED light string, and the end of the electrical capacitor, the LED light string being further electrically connected to the constant current driving chip, the electrical capacitor being further electrically connected to the first MOS transistor, the second MOS transistor, and the power supply module, the first MOS transistor being further electrically connected to the first voltage comparator, the constant current driving chip, the opposite end of the first electrical inductor, and the end of the first rectifier diode, the second MOS transistor being further electrically connected to the first voltage comparator, the opposite end of the second electrical inductor, and the end of the second rectifier diode, the first voltage comparator being further electrically connected to the constant voltage power source, the first and second MOS transistors being both electrically connected to the power supply module;

wherein the electrical capacitor is an electrolyte capacitor;

further comprising: a first and a second resistors, the first resistor having an end electrically connected to the LED light string and the constant current driving chip and an opposite end electrically connected to a grounding line, the second resistor having an end electrically connected to the constant current driving chip and an opposite end electrically connected to the grounding line;

wherein the first MOS transistor comprises a first gate terminal, a first drain terminal, and a first source terminal, the first gate terminal being electrically connected to the first voltage comparator and the constant current driving chip, the first drain terminal being electrically connected to the opposite end of the first electrical inductor and the end of the first rectifier diode, the first source terminal being electrically connected to the power supply module;

wherein the second MOS transistor comprises a second gate terminal, a second drain terminal, and a second source terminal, the second gate terminal being electrically connected to the first voltage comparator, the second drain terminal being electrically connected to the opposite end of the second electrical inductor and the end of the second rectifier diode, the second source terminal being electrically connected to the power supply module;

wherein the first voltage comparator comprises a first output pin, a first positive input pin, and a first negative input pin, the first output pin being electrically connected to the second gate terminal of the second MOS transistor, the first positive input pin being electrically connected to the constant voltage power source, the first negative input pin being electrically connected to the gate terminal of the first MOS transistor and the constant current driving chip;

wherein the constant current driving chip comprises first to third pins, the first pin being electrically connected to the first negative input pin of the first voltage comparator and the first gate terminal of the first MOS transistor, the second pin being electrically connected to the LED light string and the end of the first resistor, the third pin being electrically connected to the second resistor;

wherein the constant current driving chip comprises: an oscillator and a second voltage comparator, the second voltage comparator comprises a second output pin, a second positive input pin, and a second negative input pin, the second output pin being electrically connected to the first pin of the constant current driving chip, the second negative input pin being electrically connected to the second pin of the constant current driving chip, the second positive input pin being electrically connected to the oscillator, the oscillator being further electrically connected to the third pin of the constant current driving chip; and wherein the constant voltage power source outputs a voltage that is smaller than or equal to a threshold voltage of the first MOS transistor, the first voltage comparator outputting a voltage that is greater than or equal to a threshold voltage of the second MOS transistor.

\* \* \* \* \*